UNITED STATES PATENT OFFICE.

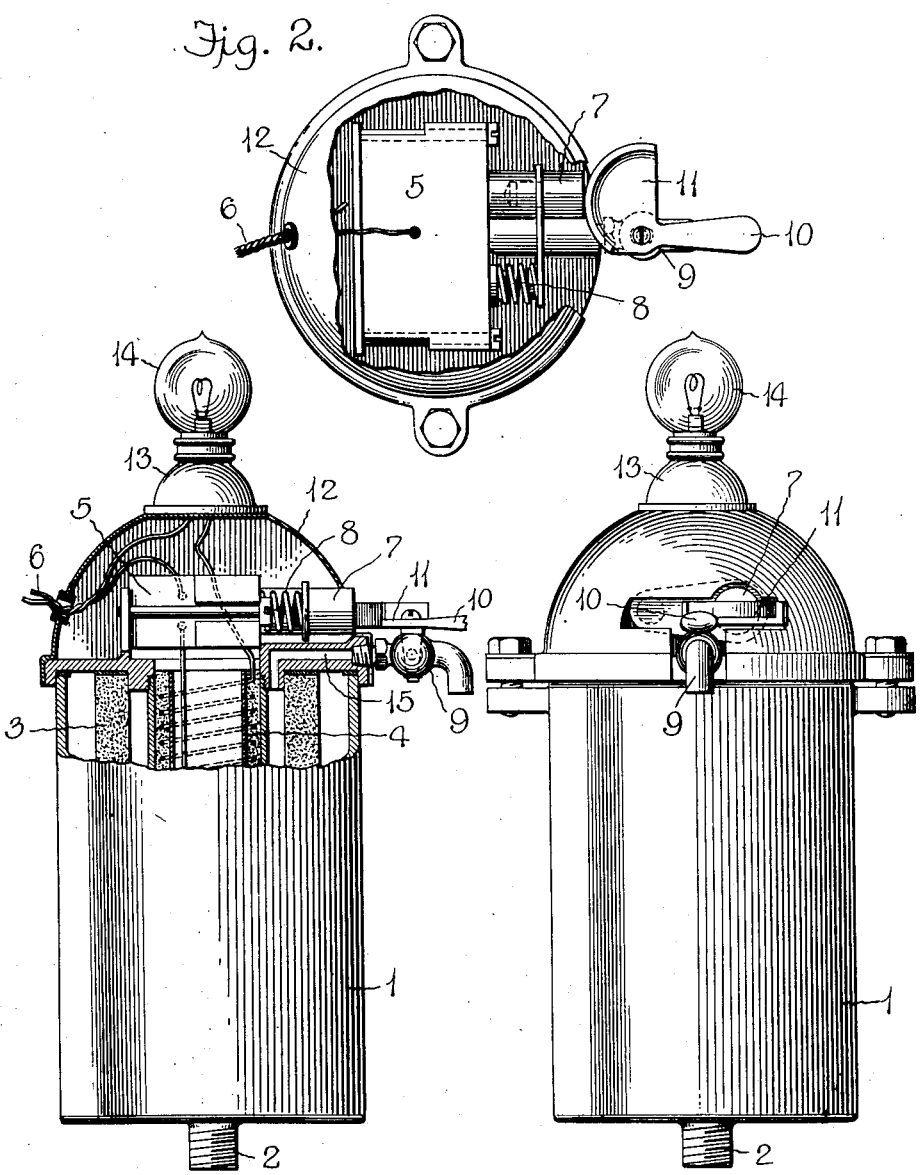

CHARLES JOERIN, JR., AND ALBERT E. JOERIN, OF DETROIT, MICHIGAN.

HEATER-FILTER.

1,162,782.   Specification of Letters Patent.   Patented Dec. 7, 1915.

Application filed January 14, 1915. Serial No. 2,123.

*To all whom it may concern:*

Be it known that we, CHARLES JOERIN, Jr., and ALBERT E. JOERIN, citizens of the United States of America, residing at Detroit, in the county of Wayne and State of Michigan, have invented certain new and useful Improvements in Heater-Filters, of which the following is a specification, reference being had therein to the accompanying drawings.

This invention relates to a combination filter and heater for providing a supply of water in dental offices, doctors' offices, restaurants or the like and to an arrangement thereof whereby the operator may draw either hot or cold water at pleasure that has been thoroughly purified before use.

The invention consists in the matters hereinafter set forth and more particularly pointed out in the appended claims.

In the drawings, Figure 1 is a view partially broken away, and partially in side elevation and partially in section, of one form of filter that embodies features of the invention; Fig. 2 is a plan view with cap piece removed and broken away showing a controlling switch valve, and Fig. 3 is a view in elevation of the filter taken at right angles to Fig. 2.

Referring to the drawings, an exterior casing 1 of appropriate material and design has a supply pipe 2 at its base and interior filter members indicated at 3 which are so disposed that water entering the supply pipe is forced to pass through the members to contact with a suitable heating device indicated at 4 that may be of any preferred type operated by electricity, and arranged, if desired, to give varying degrees of heat. While any form of filter that is suitable may be used, the type described is that of our prior United States Patent No. 1,075,978, issued Oct. 14, 1913.

An insulating plate 5 forms a switch support for an electric cut out between the two leads 6 of conductors from a suitable source of electrical energy for the heating means 4. In preferred form, the switch is operated by a reciprocable push rod 7 with return spring 8.

An outlet duct indicated at 15 from the interior of the filtering means, is controlled by a combined switch operator and faucet 9 that is preferably of the plug closure type and at any rate is so arranged that when a lever handle 10 that controls the operation of the closure, is in one position, as for example that indicated in the figures, the faucet or valve is closed. A cam plate 11 formed on or secured to the handle 10 to move therewith, bears against the push member 7 and when the handle 10 is turned in one direction as for example, counter clockwise, the electrical circuit is closed by the switch. When the lever 10 is swung in the other way the cam 11 recedes from the push member 7 or is arranged so as not to disturb it and the water from the filter is accordingly not heated. A casing 12 covers the working parts of the switch as a housing therefor and may, if preferred, be provided with a lamp socket 13, and bulb 14 that is suitably connected in the electric heating system so as to be thrown on and off when the switch is operated as a tell-tale to the user.

As a result of this construction a filter heater is obtained whereby the operator can instantly have hot or cold water at will by proper manipulation of the faucet or water valve.

Obviously, changes in the details of invention may be made without departing from the spirit of our invention and we do not care to limit ourselves to any particular form or arrangement of parts.

What we claim is:

1. In a water filter having a two-way outlet valve, a heating member for the filter adapted to be electrically energized, conductors leading from the heating means, a switch in series with the conductors, and a member for opening the faucet, adapted to close the switch when the faucet is turned in one direction from closed to open position.

2. In a filter having an outlet faucet and an operating member therefor adapted to open the faucet when moved in either direction from closed position, an electrically energized heating element mounted in the filter for warming the contents thereof, and provided with electrical conductors, a switch in series with the conductors for breaking a circuit therethrough, and a cam member on the operating handle of the valve adapted to contact with the switch and throw it open when the valve member is moved from closed position to one open position only.

3. In a filter having an outlet valve adapted to be opened by an operating member when the latter is moved from closed position to either one of two open positions, electrically energized heating means for warming the contents of the filter appropriately mounted therein, conductors for leading electricity to the heating elements, a cut out switch mounted on the filter in series with the conductors and a member for operating the switch that is moved from open to closed position by the operating member of the valve when the latter is moved from closed to one open position only.

4. A filter having an outlet valve and a member for operating the valve adapted to open the valve when moved from closed to either one of two open positions, electrically energized heating means appropriately mounted in the filter for warming the contents thereof, conductors for supplying the heating means, a normally open electrical switch in series with the conductors mounted on the filter and provided with a normally projecting operating member for closing the switch, and a cam on the valve operating member adapted to move the operating member of the switch to closed position when the operating member of the valve is moved to one open position only.

In testimony whereof we hereby affix our signatures in the presence of two witnesses.

CHARLES JOERIN, Jr.
ALBERT E. JOERIN.

Witnesses:
ANNA M. DORR,
C. R. STICKNEY.